May 2, 1950          J. McAFEE          2,505,905
FLUID METER
Filed Jan. 17, 1945
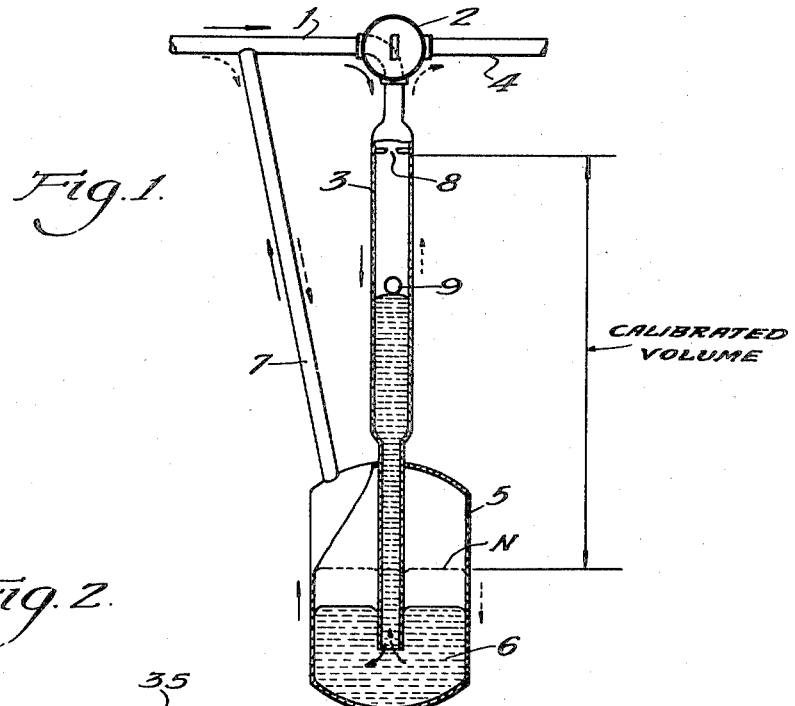
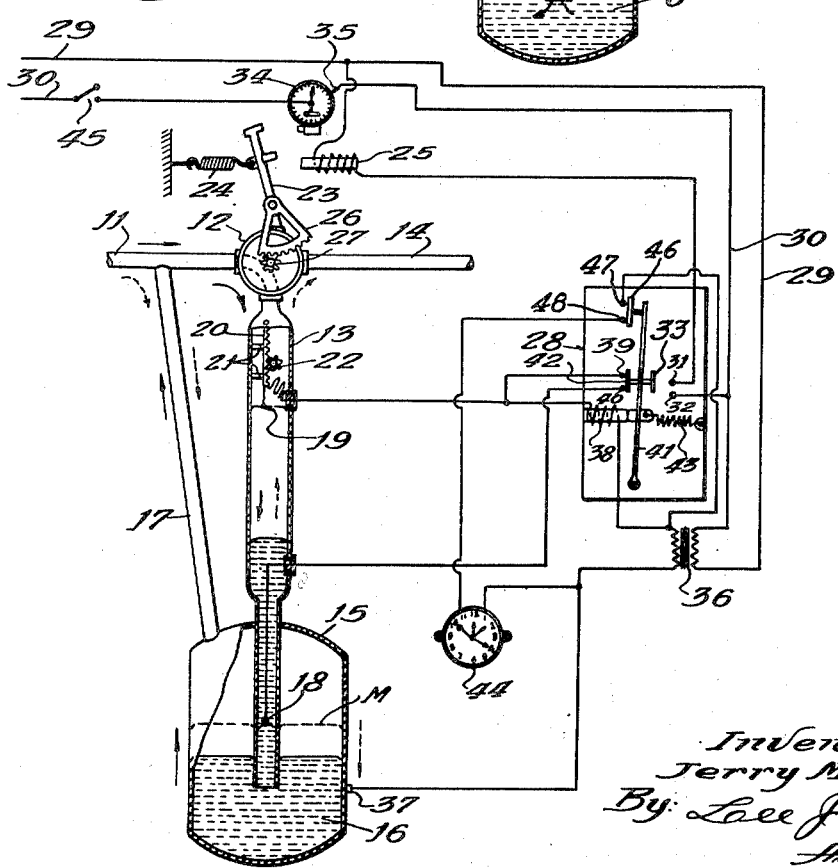
Inventor:
Jerry McAfee
By Lee J. Gary
Attorney Patented May 2, 1950

2,505,905

UNITED STATES PATENT OFFICE 2,505,905

FLUID METER

Jerry McAfee, Riverside, Ill., assignor to Universal Oil Products Company, Chicago, Ill., a corporation of Delaware Application January 17, 1945, Serial No. 573,153

4 Claims. (Cl. 73—223)

This invention relates to an improved type of apparatus for measuring out desired volumes of a fluid, as well as means for measuring the total volume of fluid flowing through a conduit.

The apparatus is of the positive displacement type employing modifications of the U-tube arrangement. A two-way valve between a supply conduit and a discharge conduit is operated to alternately change the flow from discharging to supplying fluid to a calibrated chamber or enlarged tube, which may be considered one leg of the U-tube. Below the calibrated tube and connected thereto is a closed reservoir, which may contain mercury or some other heavy liquid that is immiscible with the fluid material that is being measured. This reservoir also has a pipe line leading directly from the supply conduit. This connecting pipe line thus forms the other leg of the analogous U-tube arrangement, and when the two-way valve is in the discharge position blocking the supply to the calibrated tube, it serves to feed the shunted fluid supply stream to the reservoir, thereby raising the mercury level in the calibrated tube and discharging the given volume of fluid therefrom. The calibrated tube contains a check valve or similar means for stopping the flow after discharging a pre-set volume of the fluid material, with the rising of the heavy liquid or mercury level in the calibrated tube operating this shut-off mechanism, and falling of the mercury level to its normal position controlling the inlet volume to the calibrated tube.

It is often desirable to measure out a number of batches or desired volumes of a certain fluid such as gasoline, lubricating oil or the like. This may be accomplished in a rather simple embodiment of the apparatus, having a hand operated two-way stop-cock or valve which alternately connects the vertical calibrated tube to the supply line and then to the outlet line, and a shut-off valve consisting of a valve-seat located in the upper part of the calibrated tube and a steel ball or similar type of plug which floats on the surface of the mercury in the said calibrated tube. Thus, with the two-way valve in the filling position the fluid flows down into the calibrated chamber as the mercury level returns to its normal position in the reservoir and the chamber is filled to the set volume. With the two-way valve turned to the discharge position, the fluid from the supply stream flows directly through the connecting line to the mercury reservoir, thus raising the level of the mercury in the calibrated tube to the point where the floating ball or plug engages the valve seat and stops the flow, with the desired volume of fluid having been discharged.

An automatic and electrically controlled form of the apparatus will be found to have further uses such as measuring average rate of flow, measuring total volume of a flow stream, or as an automatic "dosing" device for introducing a given quantity of inhibitor or some other chemical into another flowing stream. The more elaborate automatic embodiment of the device provides a motor or solenoid to operate the two-way valve which alternately allows the calibrated portion to be filled and emptied, a suitable relay or the like which is responsive to the change in liquid level in the said tube, and in turn operates to control the two-way valve operating solenoid, a timing device such as a synchronous motor clock, being operated from the same circuit as the one energizing the relay solenoid and a counting device which may be any conventional trip-lever counter. The metering device thus becomes automatic for measuring out any number of batches of the fluid. The advantage of being able to easily read and compute the total volume dispensed and the average rate of flow in the supply line is also found in the automatic form of the device. Further control may be had by having a counter with an adjustable setting whereby the main circuit is broken after a given set number of volumes of fluid have been discharged. Still another desirable feature may be incorporated into the apparatus, by providing means to adjust the position of the upper level electrode in the calibrated tube thereby being able to obtain varying volumes of the fluid.

This automatic embodiment of the fluid measuring apparatus incorporates some of the features used in my U. S. Patent 2,325,695, issued August 3, 1943; however, the new invention has several basic differences such as obtaining interrupted flow, the use of a two-way valve, and the adjustable means for obtaining a desired volume of the fluid from the calibrated chamber.

The features of the invention will be more apparent with reference to the accompanying diagrammatic drawings and the following description thereof. The drawings illustrate two specific forms of the apparatus provided for by the invention.

Figure 1 is a diagrammatic elevational view, shown partly in cross-section, of the simpler form of the apparatus provided by the invention, for measuring out of relatively small desired volumes of a fluid.

Figure 2 is a diagrammatic elevational view, also partially in cross-section, which illustrates another embodiment of the apparatus, including suitable electrical and mechanical devices for aumatic control and regulation of this specific form.

Referring now to Figure 1, the supply conduit from which the fluid is to be measured is designated by the numeral 1, the direction of flow being indicated by arrows. A two-way valve 2 is used to alternately connect a vertical calibrated tube or chamber 3 to the supply conduit 1 and the discharge conduit 4. The lower end of the calibrated tube 3 extends into a closed reservoir 5 which contains a heavy liquid 6 which is non-miscible and non-absorbable with the fluid to be measured. It is important that the lower end of the calibrated tube 3 extend enough below the normal heavy liquid level so that a seal is maintained between the upper portion of the reservoir 5 and the calibrated portion of the tube 3. A connecting pipe line 7 is provided between the upper portion of the reservoir 5 and the fluid supply conduit 1. Within the calibrated tube is provided a valve consisting of a valve-seat 8 and a floating ball or plug 9. This ball 9 is made of a material or is constructed in such a manner, that it will float at the top surface of the heavy liquid material 6, but will not float in the fluid which is to be measured out and is above the surface of this said heavy liquid.

In operation, with the two-way valve 2 in the filling position, the flow is as indicated by the solid line arrows. The fluid to be measured enters the calibrated chamber 3 from the supply conduit 1, with the heavy liquid 6 receding down the tube 3 until its normal balanced level is reached, indicated by the letter N. The flow will automatically stop when this level N is reached because of the balanced fluid pressure in each of the two legs, the conduit 7 and the tube 3.

After the calibrated tube 3 is filled the two-way valve 2 may be given a quarter turn to the discharge position, which connects the calibrated tube 3 to the outlet conduit 4. With the supply fluid thus blocked by the valve 2, the flow will be, as indicated by the dotted line arrows, through the conduit 7 to the upper part of the reservoir 5. The fluid pressure acting on the surface of the heavy liquid 6 in the reservoir 5 will thus force the level N down on the outside of the lower part of the tube 3, but it will raise the heavy liquid level on the inside of the calibrated tube 3 discharging the fluid from the said calibrated tube. The discharge of fluid from the tube 3 stops, when the ball 9 engages the seat 8, thus it will be noted that the volume in the tube 3 between the level N and the level of the valve-seat 8, is the volume of fluid that is discharged. Therefore, to obtain a desired volume of fluid, the size of the chamber or tube 3 must be made suitable and then the level of the valve-seat 8 and the level N of the heavy liquid accurately placed to give the desired volume of fluid that is to be measured out. After the discharge flow stops from conduit 4, the valve 2 may be turned back to the original filling position, allowing the fluid to again fill the calibrated tube 3 as the heavy liquid 6 recedes to its normal level N.

This manually operated apparatus will be particularly useful when only a relatively few volumes of fluid are to be measured out; however, where a number of these small volumes are to be measured out over a protracted length of time or where the device is to be used for the systematic introduction of given batches of liquid into another stream, then an automatic form of the invention should be utilized such as will now be described.

In Figure 2, the supply of fluid to be measured enters through conduit 11; the direction of flow is indicated by the arrows. A two-way valve 12, which will be automatically operated, is placed so that it alternately connects a vertical calibrated tube 13 to the supply conduit 11 and to a discharge conduit 14. The lower end of the calibrated tube 13 extends into a closed reservoir 15 which contains a heavy liquid 16 such as mercury which is non-miscible and non-absorbable with the fluid to be measured and also is more conductive to electricity. As may be noted in the drawing, the lower projection of the calibrated tube 13 must extend low enough to always remain below the level of the mercury or heavy liquid 16 in the reservoir 15, thereby maintaining a liquid seal between the upper part of the tube 13 and the upper part of the reservoir 15. A direct interconnecting conduit 17 is provided between the supply conduit 11 and the upper part of the reservoir 15.

Within the calibrated tube 13 are placed two electrical contact points 18 and 19, which are insulated from, and are suspended away from, the walls of the tube 13. The lower contact point 18 is placed at an elevation just above the liquid level M, which is the normal level of the heavy liquid, while the upper contact point 19 is placed at an elevation to give a desired volume of fluid in the calibrated tube 13. This contact point 19 may also have means to adjust its elevation and thereby obtain varying desired volumes of the fluid that is to be measured. One means for vertical adjustment of the contact point 19 is indicated by its attachment to a slidable toothed rack 20, this toothed rack having guide supports 21 which may be attached to the wall of the tube 13. Movement of the toothed rack 20 may be accomplished by turning a small gear 22, which is mounted on a small shaft through the wall of the tube 13. A stuffing box or packing gland or other conventional means may be used for passing the shaft through the wall and therefore no illustration is shown. A crank or a squared end on the shaft for the use of a wrench or some other conventional means, none of which is illustrated, may be used to turn the gear 22 which in turn will vertically move the contact point 19. It is, of course, within the concepts of this invention to use any desired mechanical means for adjusting the contact point 19.

The two-way valve 12 for this apparatus should be of the rotary plug type and the position of the plug is changed to switch the flow of the fluid therethrough by the reciprocating movement of the lever 23 which is operated by the spring 24 and the solenoid 25. The lower end of the lever 23 has a toothed quadrant 26 which meshes with the gear 27 provided on the stem of the valve 12 to thus provide means for turning the valve plug.

The magnetic relay 28 operates to supply electrical energy from any convenient source through lines 29 and 30 to the solenoid 25, and is responsive to the change of liquid level in the calibrated tube 13. The coil of the solenoid 25 is connected at one end to the line 29 and its other end is connected with contact point 31 of the relay. An adjacent contact point 32 is connected to the power line 30 so that when contact points 31 and 32 are bridged by the conductor 33 on arm 41 of the relay, the circuit through the solenoid 25 is completed.

Each time the lever 23 is operated by the solenoid 25 its upper extension acts to trip the lever of a counter 34, thus registering the number of volumes of fluid that have been measured out. The counter provided may also be of a type that breaks the electric circuit running therethrough after having reached a pre-set number of operations, the counter having a moveable stop 35 or other means for making the circuit breaker setting adjustable for a varying number of operations.

Lines 29 and 30 also supply current to the primary winding of a step-down transformer 36. The secondary winding of the transformer, in which low voltage is produced has one end grounded at point 37 to the metal wall of the reservoir 15, and the opposite end is connected to one end of the magnetic coil 38 of the relay. The other end of the magnetic coil 38 branches, with one branch connected to the upper contact point 19 positioned in the upper end of the calibrated chamber 13, and the other branch line connecting to a contact point 39 of the relay. Adjacent the point 39 in the relay 28 is the contact point 40 which leads to the contact point 18 positioned at the lower extremity of the calibrated tube 13; thus as the magnetic coil 38 operates and pulls the arm 41 of the relay, the conductor 42 on the moving arm 41 bridges between points 39 and 40 to complete the circuit which may be maintained while the heavy conductive liquid 16 is in the calibrated portions of tube 13. The spring 43 in the relay 28 operates to pull the arm 41 and the conductor bar 33 against the other set of contact points 31 and 32 when the electrical circuit is broken to the magnetic coil 38. It will, of course, be apparent to anyone that is familiar with electric circuits that the conductors 42 and 33 should be insulated from the moveable arm 41; also that the solenoid 38 and the spring 43 in mounting to the relay box should be insulated therefrom.

A synchronous motor which operates a timer 44 is connected to the low voltage circuit from the transformer 36, so that it will operate during the filling period only and thereby make it possible to check the average flow rate of the fluid being measured if it is so desired. The operation of the timer 44 during the filling period only, is accomplished by an extension of arm 41 having conductor 46 which bridges between contact points 47 and 48. The contact point 47 is connected to one side of the secondary winding of the transformer 36, while the contact point 48 connects directly to the timer 44. Thus, as the solenoid 38 is energized and deenergized as the result of the rising and falling of the mercury 16 in the calibrated tube 13, the circuit to the timer 44 is completed and broken by the conductor 46 on the extension of arm 41.

To further illustrate the operation of the apparatus, we assume that the switch 45 in the main line 30 has been open, which in turn means that the solenoid 25 could not be energized and that the spring 24 would have the valve operating lever 23, as illustrated. With the two-way valve as shown, the fluid being supplied through conduit 11 will have filled the calibrated chamber and the conduit 17, and the mercury would be at its normal equalized level M. Also spring 43 would have the relay arm 41 pulled against contact points 31 and 32 since the solenoid 38 would not be energized. By closing the switch 45 the electrical energy, through line 29 and through line 30 by way of the relay conductor 33, will be supplied to the solenoid 25 to thus move the arm 23 which turns the gear 27 and the rotary plug of the two-way valve 12 to the discharge position. At the same time as the arm 23 is pulled to the solenoid, its upper extension trips the lever on the counter 34, so that the number of volumes discharged will be automatically registered. The fluid flow with the valve turned will then be as indicated by the dotted arrows. The fluid pressure and flow from the supply conduit 11 shunted to the reservoir 15 by way of line 17 forces the heavy liquid level M downward in the chamber 15 but upward in the tube 13, thereby forcing the given volume of fluid out through the discharge conduit 14. As the liquid 16 rises in the calibrated tube, contact is first made with point 18 and then finally with point 19, this latter point 19 having previously been set to measure out a given volume of fluid material. The low voltage circuit from the secondary winding of the transformer 36 is completed as the level of point 19 is reached, so that the solenoid 38 is energized pulling the movable arm 41 to bridge the contact points 39 and 40, and at the same time breaking the circuit to the solenoid 25 between contact points 31 and 32. With the primary circuit to solenoid 25 broken, the spring 24 again acts to reverse the flow through the two-way valve 12 and to refill the measuring tube 13; also as the contact point 19 was reached by the conductive liquid 16 the circuit through contact point 18 is established and held until the tube 13 is entirely refilled with the fluid to be measured and/or until the conductive liquid 16 falls below the point 18 to its normal level M. With current being maintained in the voltage circuit by the contact point 18 the solenoid 38 is kept energized and the timer 44 is made to operate for the period required for refilling the calibrated tube 13.

In the operation outlined above, if the fluid to be measured is, for example, a liquid hydrocarbon and the heavy liquid in the reservoir is mercury then there will be sufficient difference in the electrical conductivity such that a low voltage current will not flow between points 37 and 19 through the hydrocarbon liquid, but will flow when the mercury reaches the contact point 19.

Assuming that the calibrated tube 13 is set to receive exactly one gallon of a hydrocarbon liquid, and five gallons of the material is desired, then by setting the circuit breaking pointer 35 on the counter 34 to the point 5, and by closing the switch 45, the apparatus will automatically measure out the desired five gallons and then shut off.

If at the same time it is desired to know the rate of flow as supplied to or flowing through the supply line 11, then by reading the number of trips indicated on the counter 34 and by noting the time shown on the clock 44 since the last reading, the flow rate can be easily computed. For example, if the counter reading is 10 and the time elapsed on the clock is 12 minutes or ⅕ of an hour then the flow rate would be (10×5=50) 50 gallons per hour. This determination should prove fairly accurate if allowed to operate a sufficient length of time although the flow is intermittent rather than continuous.

As was briefly mentioned previously, the apparatus would also be very useful for intermittently introducing inhibitor or any other solution to another body or flow stream of material. Another valve or other regulating means would be required in the main inlet supply conduit for this usage, in order to obtain regulation of the amount of material being added.

While the measurement of hydrocarbon liquids has been mentioned in the above cases in the operation of the device it should be understood that it is equally applicable for measurement of other liquids, or by using a suitable constant or correction factor to compensate for the weight of the mercury or other displacement fluid in the U-tube, the volumes of gases or other compressible fluids may also be measured out.

I claim as my invention:

1. An apparatus for measuring fluids comprising an inlet conduit, an outlet conduit, a vertically disposed enlarged calibrated tube, flow switching means comprising a two-way valve for switching flow from said inlet conduit to said tube and from said tube to said outlet conduit, a closed reservoir containing a heavy displacement liquid which is non-miscible with the fluid to be measured, said reservoir being communicative with and disposed below the calibrated tube and having the lower portion of said tube extend therein to a point below the level of said contained heavy liquid, an interconnecting conduit independent of said flow switching means and providing direct communication between said inlet conduit and the upper portion of said heavy liquid reservoir at all times during the operation of the apparatus, said interconnecting conduit conducting shunted fluid flow, responsive to said two-way valve, to and from said reservoir and being operative to alter said heavy liquid level, a floating plug and seat check-valve positioned in said calibrated tube operating to control the volume of fluid flow therefrom and being responsive to the rising and falling level of said heavy liquid displacement medium.

2. An apparatus for measuring fluids comprising in combination, an inlet conduit, an outlet conduit, a vertically disposed enlarged calibrated tube, a two-way switch valve normally connecting said inlet conduit to said calibrated tube, a closed reservoir containing a heavy electrically conductive displacement liquid which is non-miscible with the fluid to be measured, said reservoir being communicative with and disposed below the calibrated tube, having the lower portion of said tube extend therein to a point below the level of said contained heavy liquid, an interconnecting conduit between said inlet conduit and the upper portion of said heavy liquid reservoir, said interconnecting conduit conducting the shunted fluid flow, responsive to said two-way valve, to and from said reservoir and being operative to alter said heavy liquid level, and electrical means for switching the two-way valve in response to changes of the level of said heavy liquid in said tube.

3. A device for measuring fluids comprising a reservoir containing a heavy liquid, a calibrated chamber vertically disposed above said reservoir and having an open lower end extending into said reservoir and below the level of heavy liquid therein, inlet and outlet conduits for supplying fluid to and discharging fluid from said chamber, flow switching means for alternately admitting fluid from said inlet conduit to said chamber and discharging fluid from said chamber to said outlet conduit, a connecting conduit independent of said flow switching means and providing direct communication between said inlet conduit and said reservoir at all times during the operation of said device, and means responsive to changes of the level of said heavy liquid in said chamber for limiting the volume of fluid discharged from said chamber.

4. The device of claim 3 further characterized in that said last-named means comprises a valve plug floating on the surface of said heavy liquid within said chamber and a valve seat disposed in the upper portion of said chamber.

JERRY McAFEE.

REFERENCES CITED

The following references are of record in the file of this patent:

UNITED STATES PATENTS

| Number | Name | Date |
|---|---|---|
| 498,314 | Skinner | May 30, 1883 |
| 1,554,811 | Gilman | Sept. 22, 1925 |
| 1,775,293 | Pfening et al. | Sept. 9, 1930 |
| 1,808,163 | Gottfried | June 2, 1931 |
| 2,116,296 | Zachariassen et al. | May 3, 1938 |
| 2,325,695 | McAfee | Aug. 3, 1943 |